Figure 1:
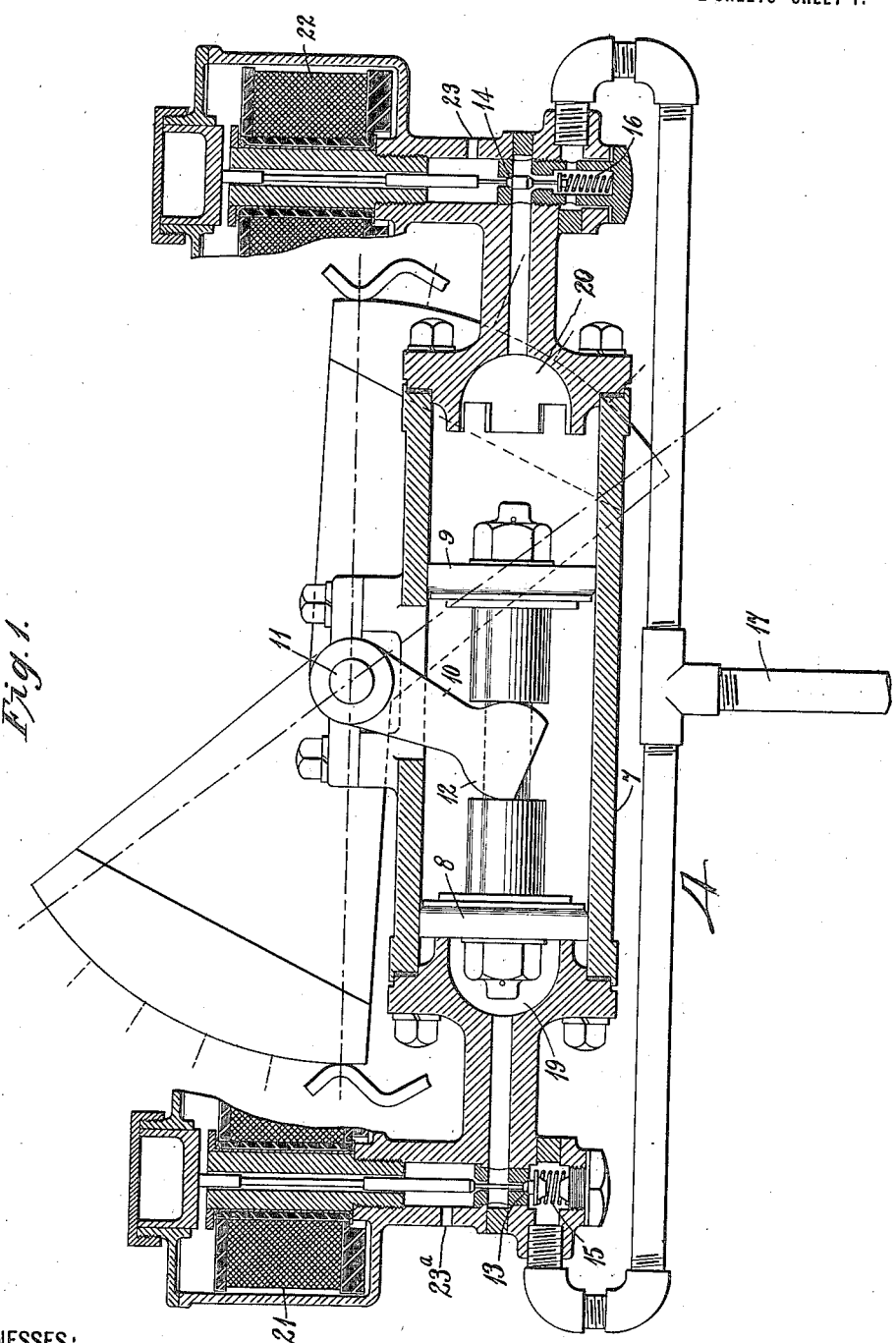

A. J. HALL & L. G. RILEY.
ACCELERATOR AND SYSTEM OF CONTROL.
APPLICATION FILED OCT. 5, 1912.

1,229,443.

Patented June 12, 1917.
2 SHEETS—SHEET 1.

A. J. HALL & L. G. RILEY.
ACCELERATOR AND SYSTEM OF CONTROL.
APPLICATION FILED OCT. 5, 1912.

1,229,443.

Patented June 12, 1917.
2 SHEETS—SHEET 2.

Fig. 2.

WITNESSES:
Ed Plinke.
W. R. Coley

INVENTOR
Arthur J. Hall &
Lynn G. Riley.
BY
Wesley G. Carr
ATTORNEY

UNITED STATES PATENT OFFICE.

ARTHUR J. HALL AND LYNN G. RILEY, OF WILKINSBURG, PENNSYLVANIA, ASSIGNORS TO WESTINGHOUSE ELECTRIC AND MANUFACTURING COMPANY, A CORPORATION OF PENNSYLVANIA.

ACCELERATOR AND SYSTEM OF CONTROL.

1,229,443.  Specification of Letters Patent.  Patented June 12, 1917.

Application filed October 5, 1912. Serial No. 724,065.

*To all whom it may concern:*

Be it known that we, ARTHUR J. HALL, a subject of the King of Great Britain, and LYNN G. RILEY, a citizen of the United States, and residents of Wilkinsburg, in the county of Allegheny and State of Pennsylvania, have invented a new and useful Improvement in Accelerators and Systems of Control, of which the following is a specification.

Our invention relates to systems of electric motor control and to control devices which form parts of such systems.

One object of our invention is to provide a simple and durable actuating mechanism, for controllers of the drum type, that shall produce a positive step-by-step movement of the controller drum in either direction, with an inappreciable amount of lost motion and a relatively small deterioration of the moving parts.

More specifically, it is an object of our invention to effect a step-by-step movement of the control drum by successively balancing and unbalancing fluid pressures upon the opposite sides of a movable piston which constitutes a part of a fluid-actuated operating device that is mechanically associated with the control drum.

A further object of our invention is to provide an electrically controlled fluid-actuated operating mechanism for moving a controller drum in opposite directions, either in a step-by-step movement or continuously, in accordance with the operation of a manually operated master controller.

Control systems for railway motors have hitherto usually comprised either a manually operated controller of the drum type adapted to directly arrange the motors for series and parallel operation and to govern the adjustment of the accelerating resistor, or a manually operated master controller and a plurality of independently operated switches for governing the motor circuits and the acceleration of the motor.

Fluid-operated actuating devices for control drums, of the types heretofore employed, have either failed to produce a positive step-by-step movement of the control drum and to insure that the drum was always brought to rest exactly at one of its normal control positions, or they have comprised a series of ratchets and pawls or brakes which rendered the mechanism expensive to construct and maintain, unreliable in operation, and objectionable for commercial service.

According to our present invention, we provide an extremely simple and compact fluid-actuated operating mechanism which is electrically controlled to effect successive balancing and unbalancing of fluid pressure upon the opposite sides of its movable piston. While the mechanism is adapted to actuate the moving parts of controllers, regulators and governors of all kinds, it is particularly well adapted for the operation of drum controllers for governing electric motors.

By employing our fluid-actuated control drum for governing the motor acceleration, the circuit connections of the system are materially simplified, the number of train lines necessary for multiple-unit control is reduced and the apparatus embodied in the system occupies materially less space than any of of the systems hitherto proposed for the same service.

The control system embodying our actuating mechanism particularly lends itself to field control, in which an additional operating speed notch is obtained when the motors are connected in series and also when they are connected in multiple circuit relation.

A preferred type of complete (main and auxiliary circuit) control system is set forth and claimed in our co-pending divisional application, Serial No. 122,378, filed September 27, 1916, and in the present specification, we will describe and explain only such control circuits and connections as are necessary to afford a thorough understanding of our present invention.

The structural arrangement of the actuator is such that a time element can readily be introduced into its operation, thereby making the control of the motors semi-automatic.

Figure 1 of the accompanying drawings is a sectional elevation of a drum-actuating mechanism constructed in accordance with our invention. Fig. 2 is a diagrammatic view of a portion of a system of electric motor control embodying and arranged in accordance with our invention.

Referring to the drawings, the system of control here shown comprises a drum-controller actuating mechanism 4 and a master switch 6.

The actuating mechanism 4 comprises a cylinder 7, pistons 8 and 9 operating therein, a connecting lever 10 pivotally supported at 11 on the cylinder 7 and having a head or enlargement 12 interposed between the pistons 8 and 9, and magnet-actuated valves 13 and 14.

The valve 13 is normally held closed and the valve 14 is normally held open either by springs 15 and 16, as shown in Fig. 1, or by the action of gravity, as shown in the diagram of Fig. 2.

The respective ends of the cylinder 7 are connected by suitable pipes 17 to a tank or reservoir 18 containing compressed air or any suitable fluid medium, such, for example, as water, oil, air, or gas at any degree of pressure either above or below that of the atmosphere. We prefer to employ compressed air as the operating medium and, in describing our invention, shall, therefore, set it forth as so operated, although the invention should not be so limited.

The valve 13, when open, admits operating fluid from the tank or reservoir 18 to one end chamber 19 of the cylinder 7, and the valve 14, when open, admits operating fluid to the opposite end 20 of the cylinder. As above described, the relation of the valves is such that, when actuated by their respective springs or by gravity, they admit operating fluid to the end chamber 20 and exhaust it from the chamber 19 and thus force the pistons 8 and 9 and the lever 10 into the positions illustrated in the drawings.

When the magnet coils 21 and 22, with which the valves 13 and 14 are respectively provided, are energized, the valve 13 is opened and the valve 14 closed. Under these conditions, operating fluid is admitted to the chamber 19 of the cylinder and is exhausted from chamber 20 through exhaust port 23, and the parts within the cylinder are moved toward the chamber 20.

In order to stop the motion of the pistons at any point, it is only necessary to interrupt the supply of energy to the coil 21, thereby permitting the valve 13 to close and to connect the chamber 19 to an exhaust port 23ᵃ. The operating fluid is thus quickly exhausted and the pressure equalized on opposite sides of the pistons which act as a unit and are therefore instantly brought to rest. This successive balancing and unbalancing of pressures on the respective sides of the pistons, whereby the pistons and operatively associated mechanism are actuated in one direction or the other or held at rest, is one of the prime characteristics of our invention, it being clear that movements are effected whenever there is a difference in pressure of the operating medium acting upon the opposite sides of the pistons, and that movement is arrested when the pressures are equalized or balanced.

Referring especially to Fig. 2 of the drawings, the operation of the system here shown is as follows:

Assuming that the switch devices occupy the positions in which they are illustrated, if a reversing control switch 24 is moved to position x and the master switch 6 is moved into position a, circuit is established from a positive line conductor 25, through a trolley 26, a conductor 27, contact fingers 30 which are bridged by a contact member 31 of the master switch, a conductor 32, contact members 33, which are bridged by a contact member 34 of a reversing control switch 24, a conductor 35, and thence to the actuating coils of a main-circuit reversing switch of a familiar type (not shown), whereby it is insured that the reversing control switch and the main-circuit reverser occupy corresponding positions, before the closure of the usual "line switches," as will be understood.

Another circuit is established from the conductor 32 through a control resistor 42, a conductor 47, which is hereinafter referred to as negative conductor 47, contact fingers 48, which are bridged by a contact member 49 of the master switch 6, a conductor 50, and a trolley 52 to an opposite line conductor 53, which may be the customary ground return, if desired.

The main-circuit initial connections are thereupon completed in any suitable manner, as more fully set forth in our above-identified divisional application, to start the governed motor or motors into operation, as will be understood.

If it is assumed that the master switch 6 is moved from position a to position b, a circuit is established from an intermediate or low-voltage point 45 of the control resistor 42, through conductor 117, through the actuating coil 21 for the valve 13 and the actuating coil 22 for the valve 14, parallel conductors 118 and 119, contact fingers 120 and 121, contact members 122 and 123 of the auxiliary-circuit or interlocking portion of the drum controller or motor accelerator 3, and contact fingers 124 and 125 which are joined by conductor 126 to a finger 127 of the master switch, from which point a single circuit continues through a contact member 128 with which the finger 127 is now in engagement, and a contact finger 129 to conductor 47, from which point a circuit is completed to the negative line conductor, as before.

The coils 21 and 22, when energized, serve, respectively, to open the valve 13 and close the valve 14. Operating fluid is, consequently, admitted from the tank or reservoir 18 through the pipe 17 and the valve 13 to the cylinder chamber 19 and, by reason of the unbalancing of fluid pressures, the pistons 8 and 9 are so moved as to adjust the accelerator 3 from a position $m$ to a position $n$. The progress of the pistons 8 and 9 is stopped at this point by reason of the fact that the contact finger 124 is disengaged from contact member 122 and therefore the coil 21 is deënergized and the valve 13 is closed to reëstablish balanced atmospheric pressures.

When the accelerator occupies position $n$, a suitable motor operating step, such as the familiar short-circuit of a main-resistor section through the agency of the illustrated main-circuit contact members, is accomplished. The governed motors are consequently accelerated and as the master switch 6 occupies successively positions $c$, $d$ and $e$, the coil 21 of the valve 13 is successively made and broken by reason of the successive engagement of contact fingers 132, 133 and 134, with the contact member 128 of the master switch and the successive disengagement of the fingers 135, 136 and 137 from the contact member 122 of the accelerator 3. Consequently, the pressures on the respective sides of the pistons are successively unbalanced and balanced whereby the accelerator is moved to occupy successively positions $o$ and $p$ and $q$.

Thus, the motors may be further accelerated to full series relation, by the gradual exclusion of further main-resistor sections from circuit, as the accelerator 3 assumes its successive positions.

If the master switch is moved from position $e$ to position $f$, contact fingers 132, 133 and 134 are disengaged from the contact member 128 and a contact finger 142 moves into engagement with the contact member 128. The circuits which were completed through the actuating coils 21 and 22 of the valves 13 and 14 are thus deënergized, permitting the valve 14 to open and the valve 13 to close. Operating fluid is consequently admitted to the end chamber 20 of the cylinder 7, and, by reason of the unbalanced pressure conditions, the pistons 8 and 9 are returned toward the position in which they are shown in Fig. 2.

As soon as the accelerator returns to position $n$ the finger 125 engages the contact member 123 and a pair of contact fingers 143 and 144 are bridged by the interconnected contact members 145. The circuit of the actuator coil 22 is thus reëstablished, closing the valve 14 and bringing the pistons 8 and 9 to rest by reason of the resulting equalized pressure in the end chambers 19 and 20. Thus, only certain main-resistor sections are included in circuit during parallel operation. Obviously, the contact members 123 may be designed to effect engagement with contact member 125 in any operating position, in order to arrest the backward or resetting movement and to provide for the inclusion of any number of resistance sections during the parallel operation of the motors.

The bridging action just referred to causes a circuit to be established from the conductor 117, through contact fingers 143 and 144, which are bridged by the members 145, a conductor 146, and thence through certain interlocking circuits, not herein shown, but fully set forth in our above-identified divisional application, to effect the initial parallel connection of the governed motors, in a well-known manner.

As the master switch successively occupies positions $g$, $h$ and $i$, the fingers 132, 133 and 134 successively reëngage the contact member 128 and the accelerator is again moved step-by-step into its positions $o$, $p$ and $q$, thereby further accelerating the motors to full parallel relation in a gradual manner by again excluding the active main-resistor sections from circuit.

Provision is also made for accomplishing a step-by-step or a continuous backward movement of the accelerator from any position, whereby the operator may drop back to any notch for a slower speed of operation without being obliged to first return the controller to the "off" position and then to notch up to the desired position.

Assume, for instance, that the master controller occupies its full parallel position $i$ and it is desired to run at a lower speed, corresponding to the first parallel position, the master controller is moved to position $f$, thereby disengaging contact terminals 132, 133, and 134 and their respective corresponding terminals on the accelerator which coöperate with the segments 122 and 123, and concurrently energizing contact terminal 127 and corresponding terminals 124 and 125 on the accelerator.

Thus, coils 21 and 22 of the valves 13 and 14 are simultaneously deënergized and remain so, until the accelerator has moved back to position $n$, which action is effected by reason of the unbalanced pressures on the pistons caused by the opening of the valve 14 and the closure of valve 13.

When position $n$ is reached, terminal 125 engages segment 123 and energizes coil 22 to close valve 14 and establish balanced pressures on the piston which brings the accelerator to rest.

It will be seen that the singular or plural movements of valves 13, 14 are "predetermined" by the structure and arrangement of the contact fingers upon master switch 6 and accelerator 3.

Our invention is not restricted to the structural arrangement of the actuator which is illustrated, or to the circuit connections and arrangement of parts illustrated in the system of Fig. 2, and, consequently, we desire that only such limitations shall be imposed as are indicated in the appended claims.

We claim as our invention:

1. The combination with fluid operated means comprising a cylinder and a piston, of electro-responsive means for successively unbalancing and balancing fluid pressures on opposite sides of the piston in accordance with the movements thereof, whereby a step-by-step movement thereof is effected.

2. The combination with fluid-actuated means comprising a pair of pistons and cylinders in which the pistons operate, of means dependent upon the position of said pistons for controlling the fluid pressure in each of the cylinders for producing step-by-step movements of said pistons in either direction or for arresting the movements thereof.

3. The combination with fluid-actuated means comprising a pair of pistons, cylinders in which the pistons operate, and independent means for controlling the fluid pressure in each of the cylinders to produce either a movement of the pistons in the one or the other direction or to hold the pistons in any predetermined position, of means operatively connected to the pistons for independently governing the controlling means.

4. The combination with fluid-actuated means comprising a pair of pistons and cylinders in which said pistons operate, of valves for controlling the fluid pressure in the respective cylinders, and automatic means dependent upon the position of said pistons for governing the action of both of said valves.

5. The combination with fluid-actuated means comprising a pair of pistons and cylinders in which the pistons operate, of valves for controlling the fluid pressure in the respective cylinders, one of said valves being normally open and the other normally closed, and means for actuating both or one of the valves to produce either a predetermined movement of the pistons or to hold said pistons in a predetermined position.

6. The combination with fluid-actuated means comprising a movable member and a hollow member in which the movable member operates, of a single electromagnetically actuated valve associated with each end of said hollow member for controlling the fluid pressure therein, one of said valves being closed when its actuating magnet is energized and the other being open when its actuating magnet is energized.

7. The combination with fluid-actuated means comprising a pair of pistons and cylinders in which the pistons operate, of electromagnetically actuated valves for controlling the fluid pressure in the cylinders, one of said valves being closed when its actuating magnet is energized and the other being open when its actuating magnet is energized, whereby the pistons are normally biased to one extreme position.

8. The combination with a movable member, and an electric switching device having relatively movable contact members one of which is operatively connected to said member, of a fluid actuator comprising a container, a piston, and valves controlled by the switching device for governing fluid pressure in the one or the other ends of the container.

9. The combination with a movable member, an auxiliary switching device having relatively movable contact members, one of of which is operatively associated with the movable member, of a cylinder, a piston operating within the cylinder, and electromagnetically actuated valves for controlling the fluid pressure in the opposite ends of the cylinder, the valve-actuating magnets being governed by the switching device.

10. A fluid-actuator comprising a cylinder, a piston disposed therein, and means for intermittently admitting fluid to one or the other sides of said piston for effecting movements thereof in either direction in a series of predetermined steps.

11. A fluid-actuating means comprising a movable piston, a cylinder and controlling means associated with said piston for governing the movement of said piston and effecting a series of distinct and predetermined steps in opposite directions.

12. A fluid-actuated means comprising a cylinder, a piston disposed therein, a plurality of electromagnetically controlled valves at the respective ends of said cylinder, controlling means embodying a master controller and an auxiliary controller associated with said piston for governing the admission and release of fluid to and from both sides of said piston whereby said piston is moved in a series of definite progressive steps.

13. A fluid-actuated means comprising a piston, a cylinder in which the piston operates, and means under the control of an operator for governing the admission and release of fluid to and from the respective sides of said piston whereby said piston may be actuated in a series of definite steps in either direction or may be held in a predetermined position.

14. A fluid-actuated means comprising a piston, a cylinder, and means for controlling the admission and release of fluid to and from the respective sides of said piston to produce movements thereof in either direction and embodying means associated with the piston for effecting predetermined distinct steps in the movement in both directions thereof.

15. A fluid-actuated means comprising a cylinder, a piston disposed therein, valves associated with the respective ends of said cylinder and on the respective sides of said piston for controlling the admission and release of fluid to and from said cylinder and means embodying a master controller and means associated with the piston for releasing fluid from one side of said piston and intermittently admitting fluid to the other side thereof in accordance with the position of the piston for effecting a uniform step-by-step movement thereof.

16. A fluid-actuated means comprising a pair of pistons, cylinders in which the pistons operate, valves controlling the admission of fluid to the respective cylinders and control means for closing one of said valves and opening the other to effect movements of said piston in one direction and for closing the second valve and opening the first valve for producing movements in the other direction, and means associated with the piston for causing said movements to be effected in a series of definite steps.

17. A fluid-actuated means comprising a piston, a cylinder, electro-magnetically controlled valves for controlling the admission of fluid to the opposite sides of said piston, one of said valves being closed and the other open when their respective actuating magnets are deënergized whereby the piston is normally biased to its initial position and means for governing said valves to effect movements of said piston in either direction in a series of definite steps.

18. A fluid-actuated device comprising a cylinder, a piston, valves adapted to admit an operating fluid to the respective sides of said piston, a master controller and an auxiliary control device associated with the piston and coöperating with the master controller for successively actuating one of said valves to effect a step-by-step movement of the piston in one direction and a second auxiliary control device associated with the piston and coöperating with said master controller for successively actuating the second valve for effecting similar movements in the opposite direction.

19. A fluid-actuator comprising a cylinder, a movable piston, valves associated with the respective ends of said cylinder for admitting an operating fluid thereto, a master controller adapted to govern the operation of said valves and auxiliary means associated with the piston and coöperating with the master controller for causing a step-by-step movement of the piston in one direction when the master controller is correspondingly moved and for causing a similar movement in the other direction in accordance with corresponding movements of the master controller.

20. A fluid-actuated means comprising a cylinder, a piston, valves for controlling the admission of an operating fluid to the respective sides thereof, a master controller and coöperating auxiliary control means associated with the piston for governing the operation of said valves whereby the piston may be moved either continuously or in a series of definite steps dependent upon the manipulation of the master controller.

21. A fluid-actuated means comprising a movable piston, a coöperating cylinder, an electro-magnetically controlled valve at one end of said cylinder and adapted to occupy an open position when deënergized, and an electro-magnetically controlled valve at the other end of said cylinder adapted to occupy a closed position when deënergized whereby unbalanced pressures act upon said piston for returning it to its initial position.

22. A fluid-actuated means comprising a movable piston, a coöperating cylinder, a single electro-magnetically controlled valve at one end of said cylinder and adapted to occupy an open position when deënergized, and a single electro-magnetically controlled valve at the other end of said cylinder adapted to occupy a closed position when deënergized.

23. A fluid-actuated means comprising a cylinder, movable piston associated therewith, a plurality of electro-magnetically controlled valves disposed at the respective ends of said cylinder for governing the admission and release of an operating fluid, one of said valves being open and the other closed when deënergized, whereby unbalanced pressures act upon said movable piston for returning it to its initial position.

24. The combination with a fluid-actuated means embodying a cylinder, a movable piston therein and a plurality of electro-magnetically controlled valves for governing the admission and release of operating fluid to and from the respective ends of said cylinder, of an auxiliary control device mechanically associated with said piston and having interlocking means adapted to intermittently change the connections of an energizing circuit of one of said electro-magnetically controlled valves at predetermined positions of said piston.

25. The combination with a fluid-actuated means comprising fluid-receiving means and relatively movable means disposed therein, of manually controllable means having a series of predetermined positions, and other means actuated by said movable means and having a corresponding number of positions for conjointly effecting a successive balancing and an unbalancing of fluid pressures acting upon said movable means whereby a step-by-step movement thereof is effected.

26. The combination with a fluid-operated actuating device embodying a cylinder and a movable piston disposed therein, of means for governing the admission and release of operating fluid to and from the opposite ends of said cylinder, said means being dependent upon the position of said piston for effecting a step-by-step movement thereof by successively balancing and unbalancing the pressures acting upon the opposite sides thereof.

27. The combination with a fluid-operated actuating device embodying a movable piston, of electrically controlled means for governing the fluid pressure acting upon the opposite sides of said piston, and means operatively connected to said piston for electrically controlling said governing means to produce a step-by-step movement of said piston.

28. A fluid-actuated means comprising a piston, a cylinder in which the piston operates, and a single controllable valve associated with each end of said cylinder, one of which valves is normally closed and the other normally opened, for governing the admission and release of operating fluid to and from said cylinder.

29. A fluid-actuated means comprising a piston, a cylinder in which the piston operates, two controllable valves for governing the admission of operating fluid to the respective ends of said cylinder, one of said valves being normally closed and the other being normally open, whereby the piston is normally biased to one extreme position.

30. The combination with a control device, of a fluid-operated mechanism embodying a movable piston associated with said control device, a containing cylinder, and a plurality of valves governed by said control device for controlling the admission of operating fluid to the one or the other side of said piston.

31. The combination with fluid operated means comprising a cylinder and a piston disposed therein, and a plurality of electromagnetically controlled valves associated with the respective ends of said cylinder, of controlling means embodying a master controller and an auxiliary controller associated with said piston for governing the admission of operating fluid to said cylinder whereby said piston is moved in a series of definite steps.

32. The combination with a fluid-operated mechanism comprising a cylinder and a movable piston contained therein, of a plurality of combined inlet and exhaust valves severally associated with the opposite ends of said cylinder for governing the admission and release of operating fluid to and from said cylinder, one of said valves normally having its inlet port open and its exhaust port closed and the other valve normally having its exhaust port open and its inlet port closed.

33. The combination with a fluid-operated mechanism comprising a cylinder and a movable piston contained therein, of a plurality of combined inlet and exhaust valves severally associated with the opposite ends of said cylinder for governing the admission and release of operating fluid to and from said cylinder, one of said valves normally having its inlet port open and its exhaust port closed and the other valve normally having its exhaust port open and its inlet port closed, and electrical control means embodying a master controller and an interlock controller actuated by said piston for operating said valves to effect step-by-step movements of said piston.

34. The combination with a fluid operating device comprising a cylinder and movable piston contained therein, of a plurality of valves associated with the opposite ends of said cylinder and normally adapted to admit operating fluid to one end of said cylinder and to exhaust it from the other end thereof, whereby said piston is biased to one extreme position, and controllable means for governing the operation of said valves to exhaust the operating fluid from the first end of said cylinder and to intermittently admit operating fluid to the other end thereof whereby a step-by-step movement of the piston is effected.

35. The combination with fluid-operated means comprising a hollow member and a movable member contained therein, of means for successively balancing and unbalancing fluid pressures on the opposite sides of said movable member in accordance with the movements thereof, whereby a step-by-step movement thereof is effected.

36. The combination with fluid-actuated means comprising a containing member and a movable member disposed therein, of an auxiliary device dependent upon the position of said movable member for electrically governing the fluid pressures in the opposite ends of said containing member for effecting movements of said movable member and for bringing it to rest in any position.

37. The combination with fluid-actuated means comprising a movable member and a containing member in which said movable member operates, of a normally open and a normally closed valve for governing the fluid pressures in the respective ends of said containing member, and means for controlling the action of said valves in accordance with the position of the movable member.

38. The combination with a fluid-actuated device comprising a fluid container and movable means disposed therein, and a single valve associated with each end of said container for controlling the fluid pressures therein, one of said valves being normally opened and the other normally closed, of means for controlling said valves for governing the operation of said movable means.

39. The combination with fluid-actuated means comprising a piston, a cylinder and means for varying the pressure in the respective ends of said cylinder to effect movements of said piston and embodying means dependent upon the position of said piston for effecting predetermined definite steps in said movement.

40. The combination with a fluid-actuator comprising a cylinder, a piston, and electrically controlled valves at the respective ends of said cylinder, of interlocking control means associated with said piston and a master controller acting in conjunction therewith for governing the operation of said valves to effect a forward actuation of said piston, said master controller having an intermediate position for causing said valves to effect a backward actuation of said piston, and said interlocking control means being adapted to arrest the backward movement in a predetermined position and reestablish the forward actuation of said piston.

41. The combination with fluid-actuated means comprising a cylinder, a piston therein and a plurality of controllable valves for governing the fluid pressures in the respective ends of said cylinder, of auxiliary means depending upon the actuation of said piston for intermittently actuating one of said valves in predetermined positions of said piston to effect a step-by-step movement thereof.

42. A fluid-operated mechanism comprising a movable member, a container therefor, and a single fluid-pressure governing means associated with each end of said container and each having supply and discharge openings, the normal condition of the openings in the respective governing means being reversed.

43. The combination with a fluid-operated mechanism comprising a movable member, a container therefor, and fluid-pressure governing means associated with each end of said container, of means for actuating both said governing means to produce movement of said member in the one direction, for restoring normal conditions in one governing means to arrest such movement, and for restoring normal conditions in both governing means to produce movement of said member in the other direction.

44. The combination with a fluid-operated mechanism comprising a movable piston member, a cylinder therefor, and valve members associated with the ends of said cylinder and each provided with an actuating coil, of means for energizing both of said coils to produce movement of the movable member in the one direction, for deenergizing one of said coils to arrest such movement, and for deënergizing both coils to produce movement of the movable member in the other direction.

45. The combination with a fluid-operated mechanism comprising a movable piston member, a cylinder therefor, a normally closed, and a normally open valve member associated with the respective ends of said cylinder and each provided with an actuating coil, of means for energizing both of said coils to produce movement of the movable member in the one direction, for deënergizing the coil corresponding to the normally closed valve member to arrest such movement, and for deënergizing both coils to produce movement of the movable member in the other direction.

46. The combination with a fluid-operated mechanism comprising a movable member, a container therefor, and a single fluid-pressure governing means associated with each end of said container and each having supply and discharge openings, the normal condition of the openings in the respective governing means being reversed, of means for reversing all such normal conditions to produce movement of said member in the one direction, for restoring such normal conditions in one governing means to arrest such movement, and for restoring all such normal conditions to produce movement of said member in the other direction.

47. The combination with a fluid-operated mechanism comprising a movable member, a container therefor, and fluid-pressure governing means associated with each end of said container, of means for effecting predetermined singular or plural manipulations of said governing means to produce movement of said member in the one or the other direction or to arrest movement thereof.

48. The combination with a fluid-operated mechanism comprising a movable piston member, a cylinder therefor, and valve members associated with the ends of said cylinder and each provided with an actuating coil, of means for effecting predetermined singular or plural energizations or deënergizations of said coils to produce movement of the piston member in the one or the other direction or to arrest movement thereof.

49. The combination with a fluid-operated mechanism comprising a movable member, a container therefor, and structurally independent fluid-pressure governing means associated with each end of said container, of electrical means for concurrently manipulating both governing means to produce a predetermined movement of said member.

50. The combination with a fluid-operated mechanism comprising a movable piston member, a cylinder therefor, and a valve member associated with each end of said cylinder and each provided with an actuating coil, of means for concurrently energizing both coils to produce a predetermined movement of the piston member.

51. The combination with a source of supply of fluid pressure, of a fluid-operated means comprising a cylinder and a piston normally biased by unbalanced fluid-pressure to a predetermined position, means for successively unbalancing and balancing fluid pressures on opposite sides of the piston, and means dependent upon predetermined conditions for intermittently arresting such movement to produce a step-by-step progression of the piston.

In testimony whereof, we have hereunto subscribed our names this 3rd day of Oct., 1912.

ARTHUR J. HALL.
LYNN G. RILEY.

Witnesses:
KARL A. LINMAN,
B. B. HINES.